A. Johnson,
Corrugating Metals.
No. 99,684. Patented Feb. 8, 1870.
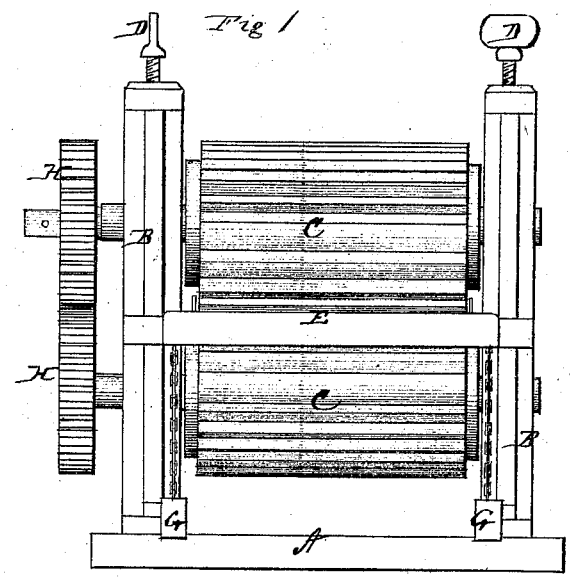
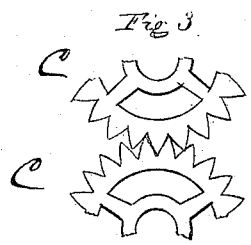
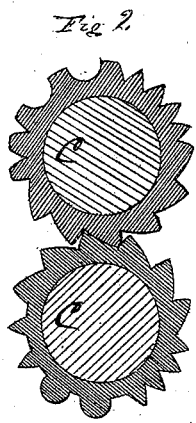
Witnesses:
Harry King
C. L. Court
Inventor:
Asa Johnson
per Alexander Mason
Attys

United States Patent Office.

ASA JOHNSON, OF BROOKLYN, NEW YORK, ASSIGNOR TO HIMSELF AND WILLIAM H. JOHNSON, OF NEW YORK CITY.

Letters Patent No. 99,684, dated February 8, 1870.

IMPROVEMENT IN MACHINERY FOR CORRUGATING AND MOULDING SHEET-METAL.

The Schedule referred to in these Letters Patent and making part of the same.

To all whom it may concern:

Be it known that I, ASA JOHNSON, of Brooklyn, in the county of Kings, and State of New York, have invented certain new and useful Improvements in "Machines for Rolling Sheet-Metal;" and do hereby declare that the following is a full, clear, and exact description thereof, reference being had to the accompanying drawings and to the letters of reference marked thereon.

The nature of my invention consists in the construction of the rollers in a machine for rolling or corrugating sheet-metals, as will be hereinafter fully set forth.

In order to enable others skilled in the art to which my invention appertains to make and use the same, I will now proceed to describe its construction and operation, referring to the annexed drawings, which form a part of this specification, and in which—

Figure 1 is a front elevation of my machine;

Figure 2 is a transverse vertical section of the two rollers; and

Figure 3 is a similar section of the rollers, showing a different mode of constructing the same.

A represents the bed-plate, upon which are placed two standards B B, a suitable distance apart.

In suitable journal-boxes, within the standards B B, the rollers C C are placed, one above the other and the upper rollers pressed down upon the lower, by means of the screws D D bearing upon the upper journal boxes, which are allowed to slide up and down in grooves made for that purpose in the standards.

In front of the rollers C C is a feed-table, E, which is moved inward to the rollers at the desired instant, by any suitable devices, and carried outward again by means of the weights G G.

The two rollers C C are connected by means of gear-wheels H H, placed outside of one of the standards on one of their journals, so that, motion being communicated to either one of said rollers, both of them will revolve in the proper direction.

The rollers C C are provided on their outer surface with two or more kinds of teeth or projections, the rollers being made either entirely solid, or hollow with a solid rim, upon which the teeth or projections are formed.

These teeth or projections are formed in the following manner:

The rollers are grooved lengthwise on a circle, equal to a circle struck from the centre of the roller, to or around the roller, at one-half the depth of the teeth or moulding to be formed. After the compass has been set, same as to form the above circle, I put one of its points at one point or end of the tooth, projection, or moulding to be formed, and the other point of compass far enough from the centre of the roller, so that when the first point, which is at the end of the tooth or moulding, is swung around, it will strike exactly at the other end of the tooth-segment, projection, or moulding to be formed, making all the profile lines on the same curve as the pitch-line of the roller.

By this mode of forming the teeth or projections, the rollers will run smoothly together, bearing as equally at all points as round rollers of the same size. They will not bind, and may be run one way as well as the other.

By having different kinds and shaped mouldings on the same rollers, I only have to groove as much surface for each kind of moulding as is required for that particular kind, which is the width of one sheet of metal.

Gear-wheels, of any kind, may have their teeth formed according to the same rules as above described for the rollers, which will cause them to run smoothly and not bind, this rule being the only perfect one by which such teeth or projections can be formed. The further they are from the pitch-line, in just such proportion they are imperfect, and will not run smoothly, but bind more or less.

Having thus fully described my invention,

I claim, as my improvement in machines for corrugating and moulding sheet-metal, constructing the surface of each roll of two or more sections, or series of longitudinal ribs or projections, and corresponding sections or series of grooves or depressions, in order to produce by the same rolls, on two or more plates, two or more different styles of corrugations or mouldings, substantially as herein set forth.

ASA JOHNSON.

Witnesses:
  I. H. SMITH,
  THOMAS FRAZER.